Aug. 12, 1952

C. E. LENNON, JR., ET AL 2,606,720

ICE SHAVING MACHINE

Filed Sept. 26, 1949

INVENTORS:
WARREN C. KISER &
CHESLEY E. LENNON, JR.
BY
F. D. Copeland Jr.
AGENT

Aug. 12, 1952 C. E. LENNON, JR., ET AL 2,606,720
ICE SHAVING MACHINE
Filed Sept. 26, 1949 3 Sheets-Sheet 3

INVENTORS:
WARREN C. KISER &
CHESLEY E. LENNON, JR.
BY
F. D. Copeland Jr.
AGENT

Patented Aug. 12, 1952

2,606,720

UNITED STATES PATENT OFFICE 2,606,720

ICE SHAVING MACHINE

Chesley Everett Lennon, Jr., and Warren C. Kiser, Longview, Tex.

Application September 26, 1949, Serial No. 117,784

3 Claims. (Cl. 241—92)

This invention relates generally to machines of the type used in preparing shaved ice for dispensing a confection known as "snow cones."

The primary object of this invention is to produce an improved machine of this class which is economical to construct and is efficient in operation.

Another object of this invention is to produce a machine of this type which can be operated by inexperienced personnel and which will have a long and trouble free operating life.

A still further object is to provide a machine made in two integral sections which can easily be disassembled for shipment or storage.

Another object is to provide an ice shaving machine which includes means to prevent the supply ice from dripping into the shaved ice when the machine is not in operation.

Yet another object is to produce a machine of this type which provides for efficient removal of excess moisture by utilizing a cutting disk with a raised hub, which prevents moisture from running down the drive shaft to the bearings and gears and which includes a tapered pan and drain to collect moisture which is thrown from the cutting disk.

These and other objects will be seen from an examination of this specification with reference to the accompanying drawing.

Figure 1:
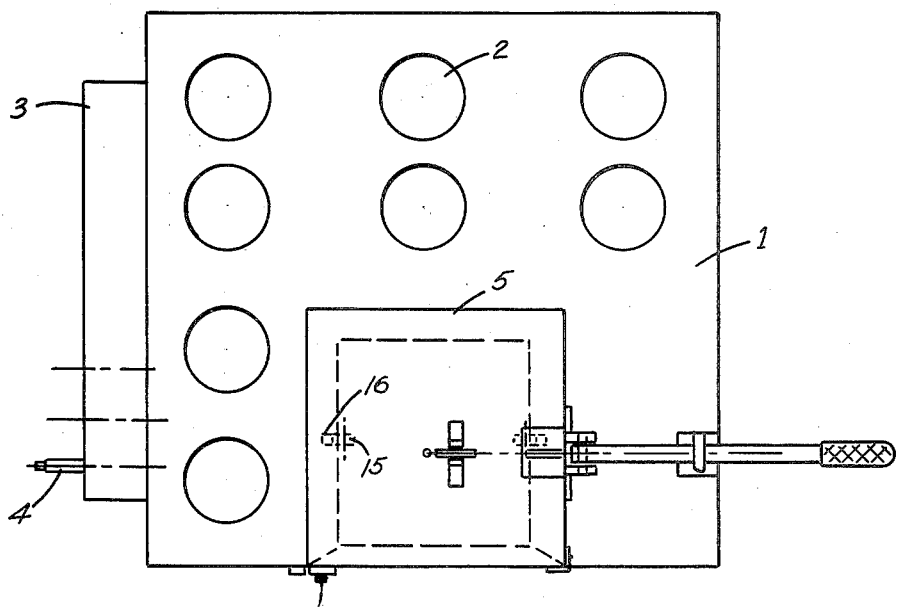
Fig. 1 is a plan view of the upper section of this machine.
Figure 2:
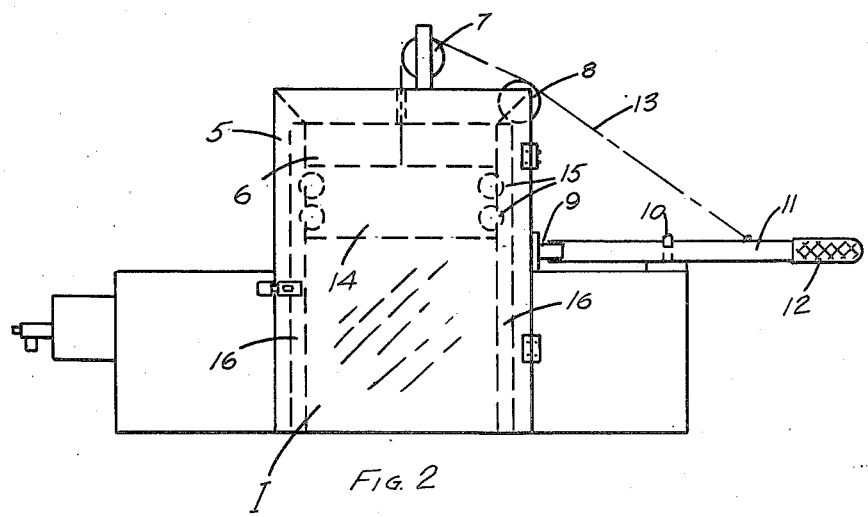
Fig. 2 represents a front elevational view of the same.

Referring now more particularly to the drawing, reference numeral 1 represents the upper section case. This case includes generally a series of bottle openings 2 for insertion of inverted juice bottles (not shown), a juice dispensing manifold 3 including spigots 4, and an upstanding ice chest 5 including ice chamber 6 and direction changing cable pulleys 7 and 8, a handle pivot 9 and handle lock 10. A weight controlling handle 11 with grip 12 is fitted into pivot 9 and is attached to tension cable 13 which passes over pulleys 7 and 8 to engagement with weight 14. This weight rests on the top of a block of ice represented at I, and causes a constant downward pressure thereupon.

To assist in raising and lowering weight 14, a series of vertically aligned bearings 15 are journalled in the weight 14 at opposite sides, and the outer race of the bearings roll in vertically cut grooves 16 in the thick walls of ice chamber 5.

Referring to the second sheet of the drawing, the lower section case 17 of this machine may be examined. Case 17 includes a tapered or sloping pan 18 including an opening 19, an upstanding moisture guard 20 and drain outlet 21. An opening 22 permits drive shaft 23 containing a cutting disk 24 at its upper end to project thru pan 18. Disk 24 includes radial blades 25 with a restricted opening 26 to the forward side thereof in the direction of rotation. The disk 24 is substantially flat so that moisture collected on or around the blades is thrown off by the centrifugal force of the disk. This disk is keyed to shaft 23 and it includes a raised hub 27 which eliminates the danger of moisture on the disk from seeping around the connection between the disk and its drive shaft.

Below pan 18, drive shaft 23 is supported by spaced bearings 28 carried by brace bars 29. Just prior to engagement in gear box 30, the shaft 23 connects with output shaft 31 by means of a flexible coupling 32. Gear box 30 is powered at a reduced speed from horizontally mounted worm gear 33 which in turn receives its driving force from a pair of belt operated pulleys 34a and 34, the latter being direct driven by a reversible electric motor 35. These pulleys provide a safety slip and also act as a flywheel to coast the worm to a more gradual stop. Motor 35 and gear box 30 are supported on a common floor brace 36 which extends between and supports the lower sides of case 17.

An opening 37 in the front wall of case 17 permits access to tray 38 which is directly under opening 19 of pan 18. By this arrangement the ice shaved by those blades 25a directly under ice chamber 6 falls thru openings 26 of the blade, opening 19 of the pan and onto the tapered side 39 of tray 38 and comes to rest in the cup portion 40 formed by the lower end of this tray.

In order to discourage melting of the shaved ice which slides down side 39 and accumulates in the cup portion 40 of tray 38, a surrounding insulating chamber 41 is located between this pan and the motor which is the most objectionable source of heat in the machine. Chamber 41 is then filled with an insulating material 42 such as glass wool which has known heat-resisting properties.

In order to prevent the moisture, resulting when the supply ice melts, from dripping thru opening 26 of the blade and opening 19 of the pan and subsequently falling into the already shaved ice which is resting in the cup portion 40 there has been provided a deflector plate 43 which is supported by a pivot arm 44 which extends partially thereunder. This deflector plate is slightly larger than opening 19 of the pan 18 so that it prevents any moisture coming from above from falling thru that opening. Arm 44 is journalled to shaft 23 between spacers 45 which are themselves fastened rigid with the shaft; this prevents arm 44 from having any appreciable axial movement. Arm 44 is however journalled to the shaft by such a fit as required to cause the arm to rotate with the shaft, but also to permit the shaft to rotate freely if arm 44 is held by some external resistance. In operation, the deflector structure will rotate with the shaft when motor 35 is turned on, but only a portion of a complete revolution and until arm 44 strikes stop 46 which extends from case 17 into its path of movement. When the motor is stopped, deflector plate 43 is returned to its functional position of covering opening 19, by reversing motor 35 for just an instant and causing arm 44 to be stopped by stop rod 47 which upstands from pan 18. A pull cord 48 is attached to arm 44 to permit manual return in case of necessity or its desirability.

Another moisture eliminating feature is the tapered trough 49 which attaches the underside of tray 38 at its lowermost edge and receives moisture that drips from the shaved ice in cup portion 40 by means of holes 50.

Figure 3:
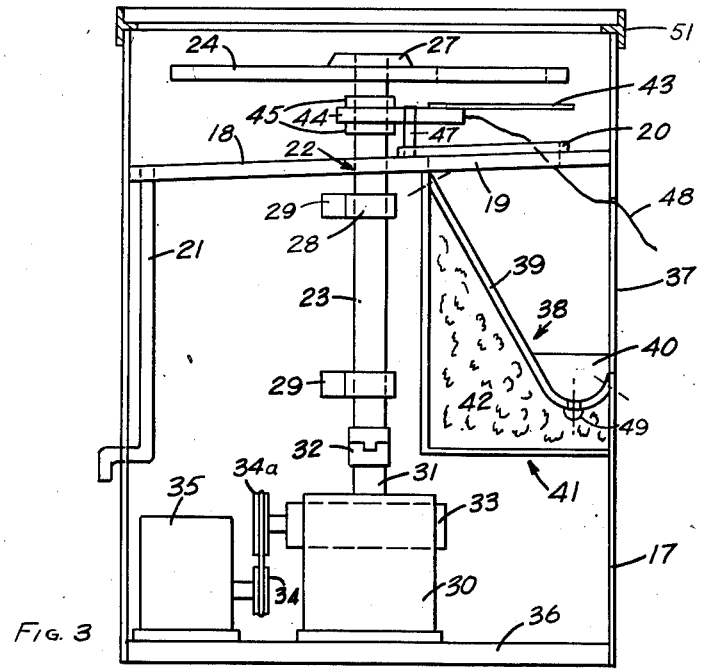
Fig. 3 is a side elevational view with the nearest side removed to show the internal mechanism and with a section thru the moulding only, to show the connecting means between the two sections.
Figure 4:
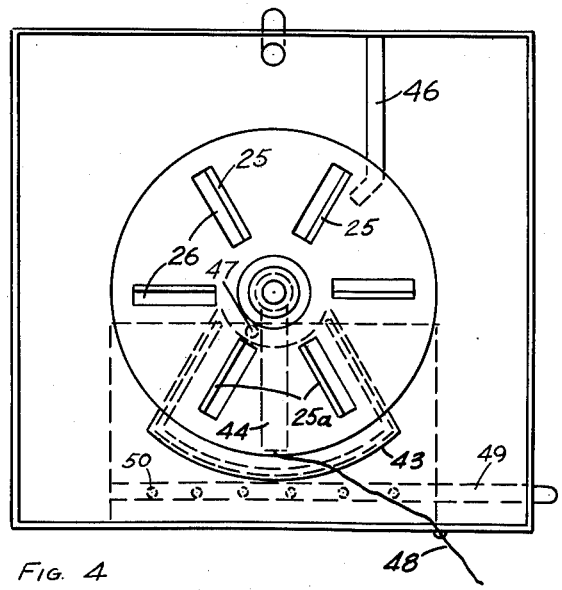
Fig. 4 is a plan view of the lower section.
Figure 5:
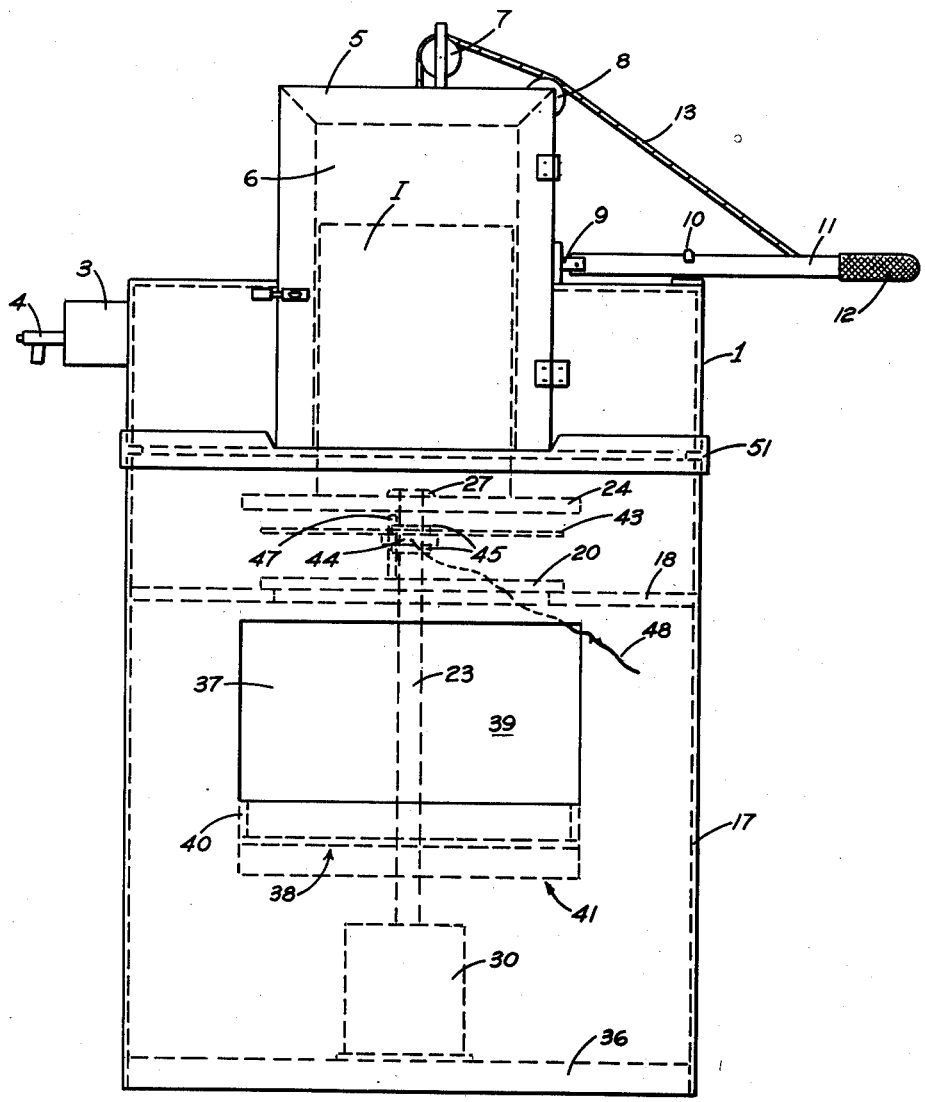
Fig. 5 is a front elevational view of the complete snow cone machine.

The upper and lower sections are contained respectively within case 1 and 17. It will be observed that there is no operative connection between these two sections, and their cases are joined to form a complete operating snow cone machine by means of a metal moulding 51 shown in Fig. 3. This moulding is attached rigid with lower section case 17, so that upper section case 1 may be lifted out of the moulding and thus disconnected from the lower case.

From the foregoing description it will be readily seen that there has been produced such a device as substantially fulfills the objects of the invention as set forth herein.

While this specification sets forth in detail the present and preferred construction of the device still in practice such deviations from such detail may be resorted to as do not form a departure from the spirit of the invention as defined by the appended claims.

Having thus described our invention, what we claim as new and useful and desire to secure by Letters Patent is:

1. In an ice shaving machine, an upstanding drive shaft, a cutting disk on said shaft for revolving therewith, a chamber for positioning supply ice above said disk, blades on said disk with restricted openings adjacent the blades, a pan below said disk and spaced therefrom, an opening in said pan below certain of said disk openings, a tray below said pan opening to receive ice shaved by said blades, means inserted between the disk and the pan to prevent any moisture due to the natural melting of the supply ice from dripping thru said blade openings and said pan opening and into said tray when the cutting disk is not revolving.

2. An ice shaving machine as in claim 1 in which said means is attached to the drive shaft and adapted to revolve with said shaft for less than one revolution.

3. In an ice shaving machine, an upstanding drive shaft, a cutting disk on said shaft for revolving therewith, a chamber for positioning supply ice above said disk, blades on said disk with restricted openings adjacent the blades, a pan below said disk and spaced therefrom, an opening in said pan below certain of said disk openings, a tray below said pan opening to receive ice shaved by said blades, an arm journalled to said drive shaft between the disk and the pan, spacers on the shaft adjacent said arm to prevent axial movement thereof, a substantially horizontal deflector plate attached to said arm, said plate positioned under said pan opening when the cutting disk is not revolving but capable of a partial revolution when said disk is revolving, a stop positioned in the path of said arm so that said arm and plate are prevented from revolving beyond said stop, and means to return said plate to its position under said openings.

CHESLEY EVERETT LENNON, Jr.
WARREN C. KISER.

REFERENCES CITED

The following references are of record in the file of this patent:

UNITED STATES PATENTS

| Number | Name | Date |
|---|---|---|
| 46,331 | Blake | Feb. 14, 1865 |
| 525,195 | Egner | Aug. 28, 1894 |
| 1,722,031 | Bert | July 23, 1929 |
| 1,741,053 | Goldstein | Dec. 24, 1929 |
| 1,977,320 | McKinney | Oct. 16, 1934 |
| 2,075,522 | Hughes | Mar. 30, 1937 |
| 2,181,000 | Shively | Nov. 21, 1939 |